Dec. 30, 1952  E. C. BALLMAN  2,624,031
SPLIT-PHASE ELECTRIC MOTOR
Filed Aug. 17, 1946
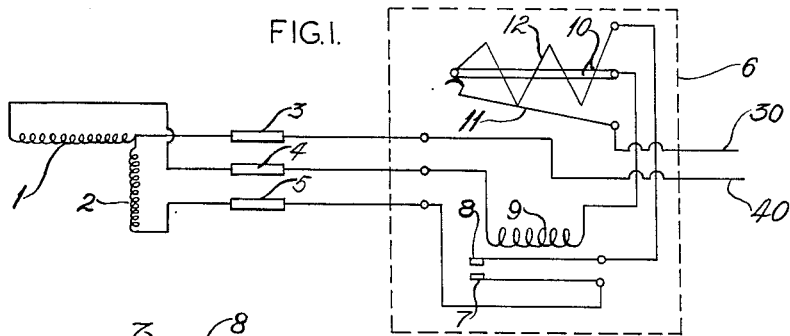
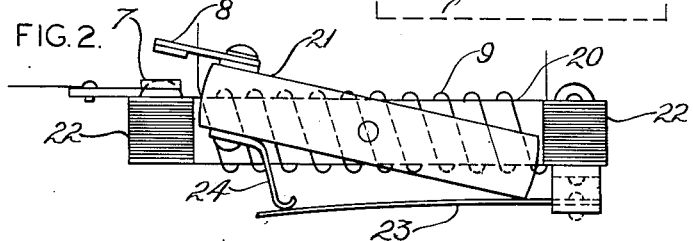
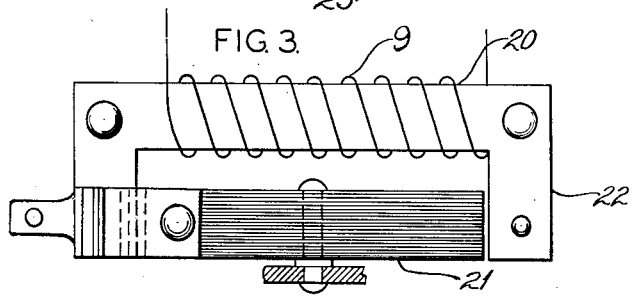
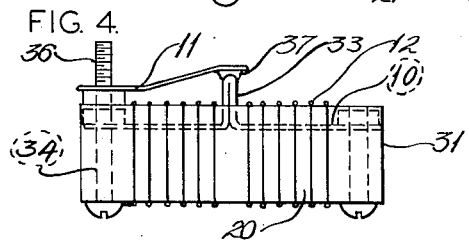
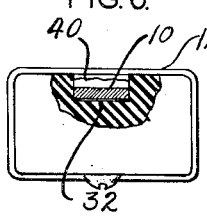
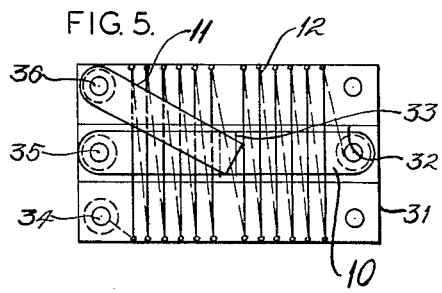
INVENTOR:
EDWIN C. BALLMAN
BY Brumigo & Sutherland
ATTORNEYS Patented Dec. 30, 1952

2,624,031

UNITED STATES PATENT OFFICE 2,624,031

SPLIT-PHASE ELECTRIC MOTOR

Edwin C. Ballman, Clayton, Mo., assignor to Ballman Engineering Company, Clayton, Mo., a corporation of Missouri Application August 17, 1946, Serial No. 691,361

2 Claims. (Cl. 318—221)

This invention relates to alternating current motors, and particularly to a resistor type, split-phase motor.

The usual split-phase motor has a delicate starting winding, in that it easily burns out if the motor is stalled even for a few seconds. It also has a sensitive switch that may become inactive due to dirt or lint, etc. getting into the motor. Furthermore, such a motor, as ordinarily constructed, cannot be used in hermetically sealed units.

One of the objects of this invention, therefore, is to provide a resistor type split-phase motor which is so constructed as to overcome the above drawbacks.

Further objects will appear from the detailed description in which will be set forth a number of embodiments of this invention; it is to be understood, however, that this invention is susceptible of various embodiments within the scope of the appended claims.

Generally stated, and in accordance with an illustrative embodiment of this invention, a resistor type split-phase motor, comprising a running winding and a starting winding, has the starting winding of low resistance and high resistance is arranged in series with the starting winding. A switch is in circuit with the starting winding and the resistance, and means is provided in circuit with the running winding adapted to open the switch when the current in the running winding drops after the motor has started, and which may also close the switch upon flow of current in the running winding at starting. The starting winding may also be provided with thermo-electric means operating upon undue increase of current in the resistance adapted to open the circuit thereof.

In the accompanying drawings:

Figure 1 is a diagram of a motor embodying this invention;

Figure 2 and Figure 3 are respectively a side view and a top view of the switch in circuit with the running winding;

Figure 4 and Figure 5 are respectively a side view and a top view of a thermo-electric means for opening the resistance in the starting winding circuit, Figure 6 being an end view.

Referring to the accompanying drawings, and more particularly to Figure 1, 1 designates the running winding and 2 designates the starting winding arranged, as usual, in a split-phase motor. The starting winding is, however, wound with relatively heavy or low resistance wire of such size that if the motor is stalled for at least a minute or two the winding will not burn out. The starting switch is connected at 3, 4 and 5, while the line connections are shown at 30 and 40.

Adjacent, or some distance from the motor, is a control box generally indicated at 6. Connected with a terminal 5 is a switch comprising a contact 7, which operates a movable contact 8, controlled by coil 9 in circuit with the running winding. The coil 9 is connected in circuit with a thermoelectric means comprising part 10 and part 11 connected with the line terminal 30. The movable contact 8 is connected with a high resistance 12, of such value as to provide the proper phase shift of the current in the starting winding relative to that of the running winding, whose left terminal is also connected with the heat conducting bar 10 fusibly connected to spring 11, leading to the line terminal 30. Thus the high resistance 12 provides a major portion of the resistance of the circuit including it and the low-resistance starting winding.

The switch in series with the running winding may be of any suitable construction so as to operate to close the switch upon flow of current in the running winding at starting, and adapted to open the switch when the current in the running winding drops after the motor has started. One embodiment of such a switch is shown in Figures 2 and 3. It comprises a laminated core 20 on which the coil 9 is wound, and a laminated armature 21 pivoted intermediate its ends between the poles 22 of the core. The switch contacts 7 and 8 are mounted on and insulated from the core and armature, respectively. The armature moves against the tension of spring 23 fixed to the core and engaged by a projection 24 on the armature.

The switch above described, and which is more fully described in co-pending application, Serial No. 691,360, filed August 17, 1946, executed and filed of even date herewith, operates as follows: When current traverses the coil 9, it will set up an armature torque which increases steeply to a peak, and thereafter falls off rapidly as the armature approaches the center position. The tension of the spring counteracts the torque and the contacts are closed at approximately the maximum torque point, corresponding to the current flowing in the running winding at starting. As the current in the running winding decreases, with resultant decrease in armature torque, the switch will open with a snap when the peak of the torque curve is reduced so as to become tangent with the counter-torque curve of the spring. The construction is, therefore, such that the switch will be closed upon flow of the current in the running winding at starting, and will open when the current in the running winding drops after the motor has started.

If the motor is stalled for any great length of time, the resistance 12 becomes hot, which is liable to cause damage, and in any event is not desirable. Thermo-electric means is, therefore, provided, operating upon undue increase or duration of current in the resistance to open the circuit thereof. Such a means is shown in Figures 4 and 5. It comprises a body or block 31 of a material of relatively high specific heat and resistance to elevated temperatures, as well as having insulating properties; material suitable for this purpose is porcelain or other ceramic products. This body is provided with a groove 32 within which is arranged a strip 10 of a metal, such as copper, which may be folded to provide a projecting contact 33 intermediate with its ends. Over this body is wound the resistance 12, which is connected at one end to the strip 10, while the other end is connected to the terminal 34 leading to the contact 8, Figure 1. The other end of the strip 35 is connected with the coil 9, Figure 1. Bearing upon the contact 33 is the contact 11 connected with a terminal 36 leading to the line 30.

The contact 11 is so tensioned as to normally move away from the contact 33, but is secured thereto by a solder 37, which will melt when the temperature rises above a predetermined value. The strip 10 may have placed thereover a ceramic cement for the purpose as will appear, and as at 40.

It will be noted that the contact 33 is arranged at the zone of greatest heat liberated by the resistance; accordingly the solder is sensitive to heat and will open at a rather accurate temperature elevation, corresponding to an undue increase or duration of current in the resistance. When this temperature, due to such current value, is reached the solder will soften or melt, and the contact 11 will spring away from the contact 33, so as to open the circuit. Since this contact 11 is connected with both the resistance in series with the starting winding, and with the coil in series with the running winding, both the starting and running circuits will be opened. After the trouble is eliminated, causing such undue increase of current, it is easy to resolder the spring. By controlling the size of the body 31, and the depth of the groove and the amount of ceramic cement between the resistance wire and the copper strip, the temperature at which the circuit will open can be accurately controlled.

Having thus described the invention, what is claimed and desired to be secured by Letters Patent is:

1. A resistor-type split-phase motor unit, comprising, a motor having a running winding and a low-resistance starting winding, and controlling means including a switch actuated by the current in said running winding to close the circuit of said starting winding at starting and to open said circuit when the motor is running, a pair of self-opening contacts joined by solder and connected in series with said running winding, a resistor in series with said starting winding providing a major portion of the resistance in its circuit, and a heat-conducting element positioned to be heated by said resistor and to conduct the heat to said solder.

2. A resistor-type split-phase motor unit, comprising, a motor having a running winding and a low-resistance starting winding, and controlling means including a switch actuated by the current in said running winding to close the circuit of said starting winding at starting and to open said circuit when the motor is running, a pair of self-opening contacts joined by solder and connected in series with said running winding, a resistor in series with said starting winding providing a major portion of the resistance in its circuit, a heat-conducting element positioned to be heated by said resistor and to conduct the heat to said solder, and heat-insulating means between said resistor and said element to regulate the time-delay in heating the latter.

EDWIN C. BALLMAN.

REFERENCES CITED

The following references are of record in the file of this patent:

UNITED STATES PATENTS

| Number | Name | Date |
|---|---|---|
| 543,198 | Thomson et al. | July 23, 1895 |
| 1,252,919 | MacCallum | Jan. 8, 1918 |
| 1,828,724 | Yost | Oct. 20, 1931 |
| 1,997,673 | Boothby | Apr. 16, 1935 |
| 2,158,288 | Kuhn | May 16, 1939 |
| 2,180,580 | Clark | Nov. 21, 1939 |
| 2,224,422 | Ballman | Dec. 10, 1940 |
| 2,235,537 | Schaefer | Mar. 18, 1941 |
| 2,259,972 | Ellis | Oct. 21, 1941 |
| 2,279,214 | Veinott | Apr. 7, 1942 |
| 2,299,669 | Werner | Oct. 20, 1942 |
| 2,320,252 | Vaughan | May 25, 1943 |
| 2,354,529 | Ludwick | July 25, 1944 |
| 2,428,784 | Cole | Oct. 14, 1947 |